(12) United States Patent
Tsuchiya et al.

(10) Patent No.: US 9,826,594 B2
(45) Date of Patent: Nov. 21, 2017

(54) VEHICLE LED LIGHTING DEVICE SYSTEM

(71) Applicant: HONDA MOTOR CO., LTD., Tokyo (JP)

(72) Inventors: Yosuke Tsuchiya, Wako (JP); Kazuhiko Mori, Wako (JP); Nobuyuki Takenaka, Wako (JP)

(73) Assignee: HONDA MOTOR CO., LTD., Tokyo (JP)

( * ) Notice: Subject to any disclaimer, the term of this patent is extended or adjusted under 35 U.S.C. 154(b) by 0 days.

(21) Appl. No.: 15/300,634

(22) PCT Filed: Mar. 31, 2014

(86) PCT No.: PCT/JP2014/059569
§ 371 (c)(1),
(2) Date: Sep. 29, 2016

(87) PCT Pub. No.: WO2015/151204
PCT Pub. Date: Oct. 8, 2015

(65) Prior Publication Data
US 2017/0118818 A1   Apr. 27, 2017

(51) Int. Cl.
*H05B 33/08*   (2006.01)
*F21V 27/02*   (2006.01)
(Continued)

(52) U.S. Cl.
CPC .......... *H05B 33/0887* (2013.01); *F21V 3/00* (2013.01); *F21V 23/04* (2013.01); *F21V 27/02* (2013.01);
(Continued)

(58) Field of Classification Search
CPC .... B60L 1/14; B60Q 1/04; B60Q 1/38; B60Q 11/007; H05B 33/0887; H05B 33/089;
(Continued)

(56) References Cited

U.S. PATENT DOCUMENTS 4,580,220 A * 4/1986 Braun ................... F02D 31/003
123/339.15
4,910,496 A   3/1990 Hatanaka et al.
(Continued)

FOREIGN PATENT DOCUMENTS

JP   63-170144 A   7/1988
JP   2008-213813 A   9/2008
(Continued)

OTHER PUBLICATIONS

International Search Report dated May 13, 2014, issued in counterpart International Application No. PCT/JP2014/059569 (1 page).

*Primary Examiner* — Vibol Tan
(74) *Attorney, Agent, or Firm* — Westerman, Hattori, Daniels & Adrian, LLP (57) ABSTRACT

An LED lighting device system for a vehicle prevents erroneous lighting of the LED lighting device due to leakage current at fee operation switch. An LED lighting device system for a vehicle is provided with an LED lighting device having an LED light source, an operation switch for lighting and extinguishing the LED light source, and a power source that is connected to the input side of the operation switch and feeds electrical current to the LED light source. The LED light device system for a vehicle has a switching element capable of blocking electrical current flowing to the LED light source and a detection unit that detects voltage on the output side of the operation switch and causes the switching element to block the electrical current.

6 Claims, 6 Drawing Sheets

(51) Int. Cl.
*F21V 31/00* (2006.01)
*F21V 3/00* (2015.01)
*F21V 23/04* (2006.01)
*B62J 6/02* (2006.01)
*B62J 6/04* (2006.01)
*B62J 6/16* (2006.01)
*B62J 6/00* (2006.01)
*B60Q 1/38* (2006.01)
*B60Q 11/00* (2006.01)

(52) U.S. Cl.
CPC ......... *F21V 31/005* (2013.01); *H05B 33/089* (2013.01); *B60Q 1/38* (2013.01); *B60Q 11/007* (2013.01); *B62J 6/003* (2013.01); *B62J 6/005* (2013.01); *B62J 6/02* (2013.01); *B62J 6/04* (2013.01); *B62J 6/16* (2013.01)

(58) Field of Classification Search
CPC ........ F21V 23/04; F21V 27/02; F21V 31/005; B62J 6/003; B62J 6/005; B62J 6/02; B62J 6/04; B62J 6/16
See application file for complete search history.

(56) References Cited

U.S. PATENT DOCUMENTS

| | | | | |
|---|---|---|---|---|
| 7,271,601 | B2* | 9/2007 | Moyer | H02H 3/05 324/713 |
| 7,449,897 | B2* | 11/2008 | Moyer | H02H 3/05 324/713 |
| 8,680,768 | B2* | 3/2014 | Takeuchi | B60Q 11/007 315/77 |
| 9,167,658 | B2* | 10/2015 | Nakajo | H05B 33/0896 |
| 9,351,369 | B2* | 5/2016 | Miyamoto | H05B 33/0887 |
| 2012/0001546 | A1 | 1/2012 | Takeuchi et al. | |

FOREIGN PATENT DOCUMENTS

| | | | |
|---|---|---|---|
| JP | 2012-11970 A | 1/2012 | |
| JP | 2013-45722 A | 3/2013 | |
| JP | EP 3127795 A1 * | 2/2017 | ........... B60Q 11/007 |

* cited by examiner

VEHICLE LED LIGHTING DEVICE SYSTEM

TECHNICAL FIELD

The present invention relates to a vehicle LED lighting device system which prevents erroneous lighting of an LED lighting device due to a leakage current of an operation switch.

BACKGROUND ART

Heretofore, in a vehicle LED lighting device system, as disclosed in Japanese Laid-Open Patent Publication No. 2012-011970, a configuration is known in which, by being equipped with a control unit that detects the state of an operation switch, and controls the supply of electric current to the LED in accordance with the detected result, the flow of electrical current to the operation switch and the LED is separated, and erroneous lighting of the LED due to a leakage current of the operation switch is prevented.

SUMMARY OF INVENTION

However, with the technique of the aforementioned Japanese Laid-Open Patent Publication No. 2012-011970, it is necessary to provide a dedicated control unit for the LED on the side of the vehicle body, and in the case that the light source of a vehicle equipped with a bulb lighting device such as a traditional halogen lamp or the like is changed to an LED type of light source, a need arises for a large scale change of not only the lighting device, but also the circuitry that is mounted on the side of the vehicle body. Moreover, since significant cost increases also occur by adding the control unit, etc., improvements have been sought.

The present invention has the object of providing a vehicle LED lighting device system, wherein, in a vehicle in which a conventional bulb lighting device is incorporated, a light source thereof is changed into an LED type of light source with minimal design changes and with lower costs, together with enabling prevention of erroneous lighting of the LED due to a leakage current of an operation switch.

The vehicle LED lighting device system according to the present invention includes the following features.

First Feature: A vehicle LED lighting device system contains an LED lighting device having an LED light source, a substrate on which the LED light source is mounted, a housing equipped with the substrate, and a lens covering the LED light source and which is attached to the housing, an operation switch configured to turn on and turn off the LED light source, a power supply connected to an input side of the operation switch, a plus cable that connects an output side of the operation switch and the LED lighting device, the plus cable being configured to supply an electric current from the power supply to the LED light source, and a minus cable configured to return an electric current that flows through the LED light source to the side of the power supply, and the vehicle LED lighting device system further contains a switching element disposed in series with the LED light source and configured to interrupt an electric current that flows to the LED light source, and a detector configured to detect a voltage on an output side of the operation switch and cause the switching element to interrupt the electric current, wherein the switching element and the detector are disposed in the interior of the LED lighting device.

Second Feature: The detector includes a leakage detecting resistance, and in the case that a voltage across the leakage detecting resistance is less than or equal to a predetermined value, the detector causes the switching element to interrupt the electric current.

Third Feature: The vehicle LED lighting device system further contains a relay between an input side of the operation switch and the power supply, the relay being configured to detect a state of illumination of the LED lighting device by an electric current, wherein, between the plus cable and the minus cable, the leakage detecting resistance is disposed in parallel with the LED light source and the switching element.

Fourth Feature: The housing includes a tubular section through which the plus cable and the minus cable pass, a fixing portion to which the substrate is attached, and an opening covered by the lens, the opening being configured to transmit light from the LED light source to the lens, the fixing portion and the LED light source are disposed inside the opening, the switching element and the detector are disposed on the substrate, and part of the substrate is inserted into the tubular section.

Fifth Feature: A distance between a fixing end part of the fixing portion on a side in the direction toward the lens and an inner wall of the tubular section on a side where the lens is disposed is longer than a thickness of the substrate.

Sixth Feature: A seal member with which the lens is sealed is disposed on an outer circumference of the opening, and a distance between an end part of the seal member on a side in the direction toward the lens and an inner wall of the tubular section on a side where the lens is disposed is longer than a thickness of the substrate, the seal member being disposed on an outer side in the vehicle transverse direction.

According to the first feature of the present invention, because the detector is included that detects a voltage on the output side of the operation switch, and causes the switching element to interrupt electric current that flows to the LED light source, erroneous lighting of the LED light source due to a leakage current of the operation switch can be prevented, together with enabling a conventional bulb lighting device to be changed to an LED lighting device without adding an LED control unit on the side of the vehicle body.

According to the second feature, the detector includes the leakage detecting resistance, and in the case that a voltage across the leakage detecting resistance is less than or equal to a predetermined value, the detector causes the switching element to interrupt the electric current. Therefore, with a simple structure, erroneous lighting of the LED light source due to a leakage current of the operation switch can be prevented.

According to the third feature of the present invention, since the leakage detecting resistance is disposed in parallel with the LED light source and the switching element at a location between the plus cable and the minus cable, the relay detects a combined electric current of the electric current flowing through the LED light source and the electric current flowing through the leakage detecting resistance. As a result, even if there is a large variation in the VF of the LED light source, since a variation of the leakage detecting resistance is comparatively small, a variation in the electric current detected by the relay can foe suppressed.

According to the fourth feature of the present invention, part of the substrate, on which the LED light source, the switching element, and the detector are disposed, is inserted into the tubular section of the housing. Therefore, the area of the substrate can be extended within the tubular section, and the sizes of the lens and the opening can be made smaller, together with securing a space on which components can be arranged on the substrate.

According to the fifth feature, since the distance between the fixing end part of the fixing portion on a side in the direction toward the lens and an inner wall of the tubular section on a side where the lens is disposed is longer than the thickness of the substrate, the substrate can easily be inserted into the tubular section.

According to the sixth feature, since the distance between an end part of the seal member on a side in the direction toward the lens and an inner wall of the tubular section on a side where the lens is disposed is longer than the thickness of the substrate, the seal member being disposed on an outer side in the vehicle transverse direction, the substrate can easily be inserted into the tabular section.

DESCRIPTION OF EMBODIMENTS

A preferred embodiment of a vehicle LED lighting device system according to the present invention will be presented and described in detail below with reference to the accompanying drawings.

Figure 1:
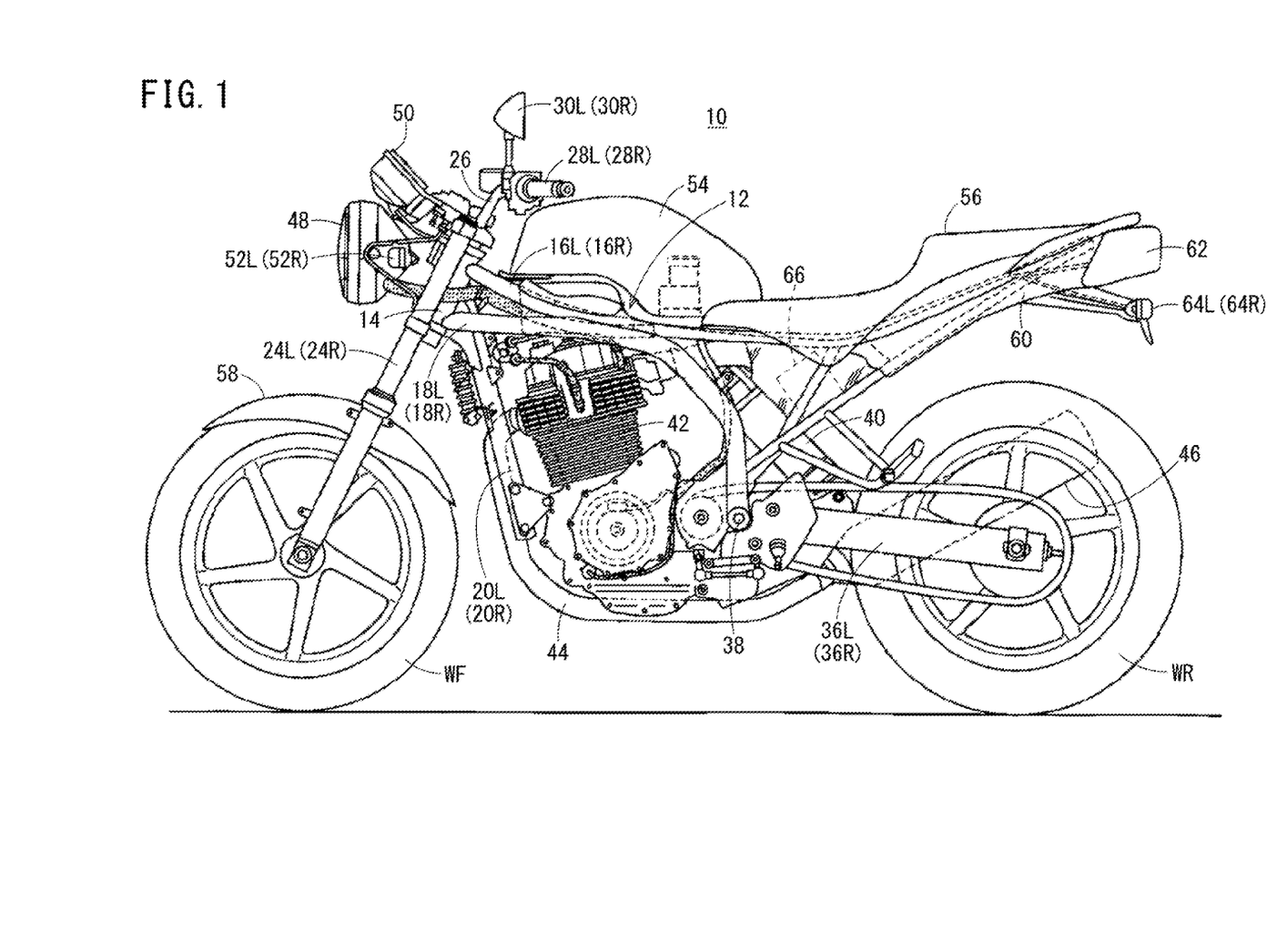
FIG. 1 is an exterior left side view of a two-wheeled motor vehicle equipped with a vehicle LED lighting device system.
Figure 2:
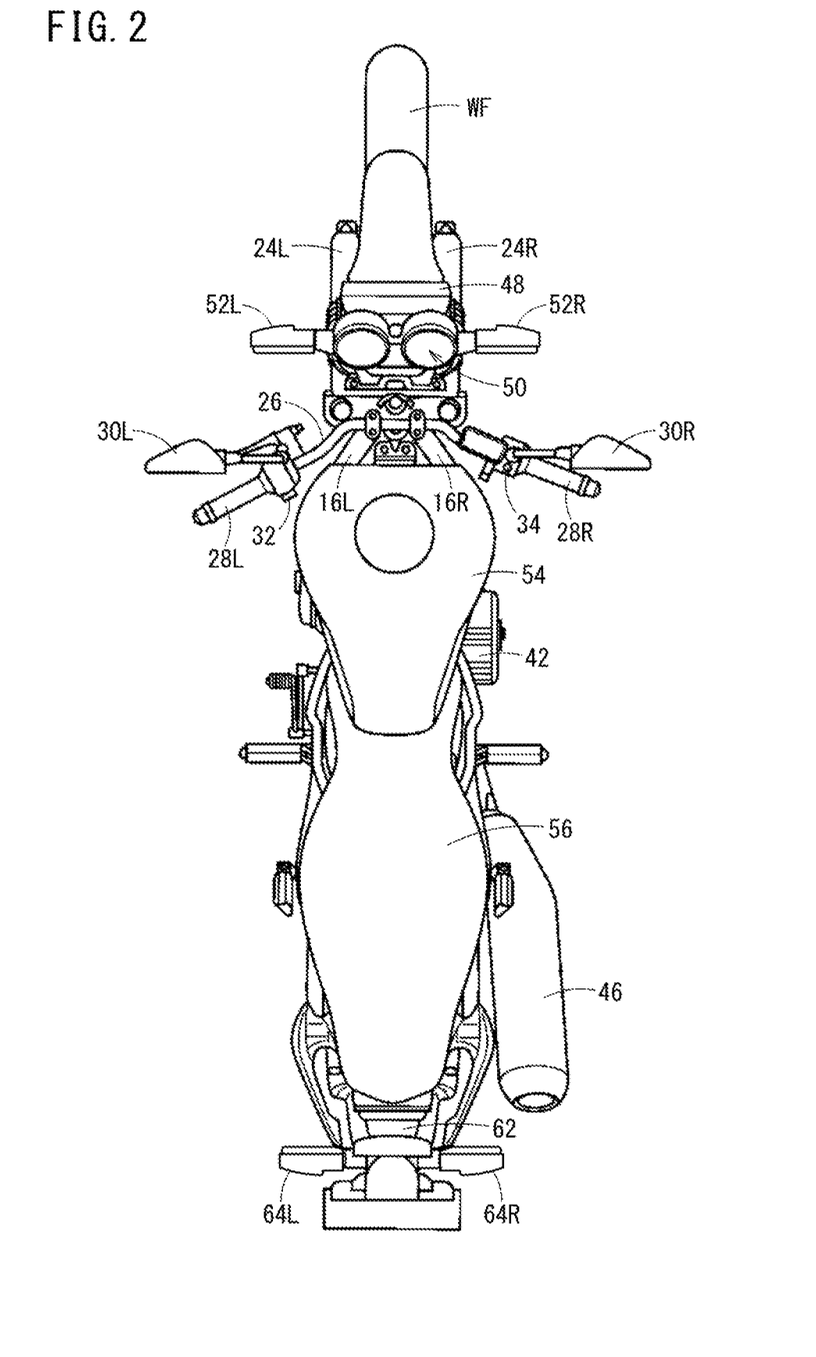
FIG. 2 is a plan view of the two-wheeled motor vehicle shown in FIG. 1.

FIG. 1 is an exterior left side view of a two-wheeled motor vehicle 10 equipped with a vehicle LED lighting device system, and FIG. 2 is a plan view of the two-wheeled motor vehicle 10 shown in FIG. 1. Unless otherwise indicated, the front and rear, up and down, and left and right directions will be described based on directions as viewed from the perspective of a driver who is seated on the vehicle body. Further, concerning mechanisms and structural components, which are provided one each symmetrically on left and right sides of the vehicle body, such elements will be denoted by appending "L" to reference numerals for the left-side elements, and appending "R" to reference numerals for the right-side elements.

The two-wheeled motor vehicle 10 includes a vehicle frame assembly 12 that makes up the vehicle body. The vehicle frame assembly 12 includes a head pipe 14 provided on a front end, a pair of left and right first main frames 16L, 16R which extend substantially rearward from the head pipe 14, a pair of left and right second main frames 18L, 18R which extend rearwardly and obliquely downward from below the first main frames 16L, 16R of the head pipe 14, and a pair of left and right down frames 20L, 20R which extend downwardly from the head pipe 14.

A pair of left and right front forks 24L, 24R for rotatably supporting a front wheel WF are supported rotatably by the head pipe 14, and a handle bar 26 is disposed on upper portions of the front forks 24L, 24R. Grips 28L, 28R and mirrors 30L, 30R are provided on left and right sides of the handle bar 26. A winker switch (operation switch) 32 is disposed on an inner side of the left side grip 28L of the handle bar 26, and a hazard switch 34 is disposed on an inner side of the right side grip 28R of the handle bar 26.

On rear end parts of the second main frames 18L, 18R, a pivot boss 38 is disposed that swingably supports a pair of left and right swing arias 36L, 36R. The second main frames 18L, 18R suspend the swing arms 36L, 36R through a rear cushion 40. The rear wheel WR is supported rotatably by the swing arms 36L, 36R. An engine 42 is disposed to the rear of the down frames 20L, 20R and downwardly of the second main frames 18L, 18R. A muffler 46 is connected to the engine 42 through an exhaust pipe 44.

In front of the head pipe 14, there are disposed a headlight 48 that illuminates the area in front of the two-wheeled motor vehicle 10, a meter device 50, and front winkers 52L, 52R in the form of LED lighting devices. A fuel tank 54 is disposed upwardly of the engine 42. A tandem-type seat 56, which is supported by the first main frames 16L, 16R, is arranged behind the fuel tank 54. A front fender 58 that covers an upper portion of the front-wheel WF is attached above the front wheel WF, and a rear fender 60 that covers an upper portion of the rear wheel WR is disposed behind the seat 56. A tail light 62 and rear winkers 64L, 64R in the form of LED lighting devices are disposed rearwardly of the rear fender 60. The two-wheeled motor vehicle 10 is equipped with a power supply (battery) 66 for supplying electrical power to electrical components such as the headlight 48, the front winkers 52L, 52R, and the rear winkers 64L, 64R.

Figure 3:
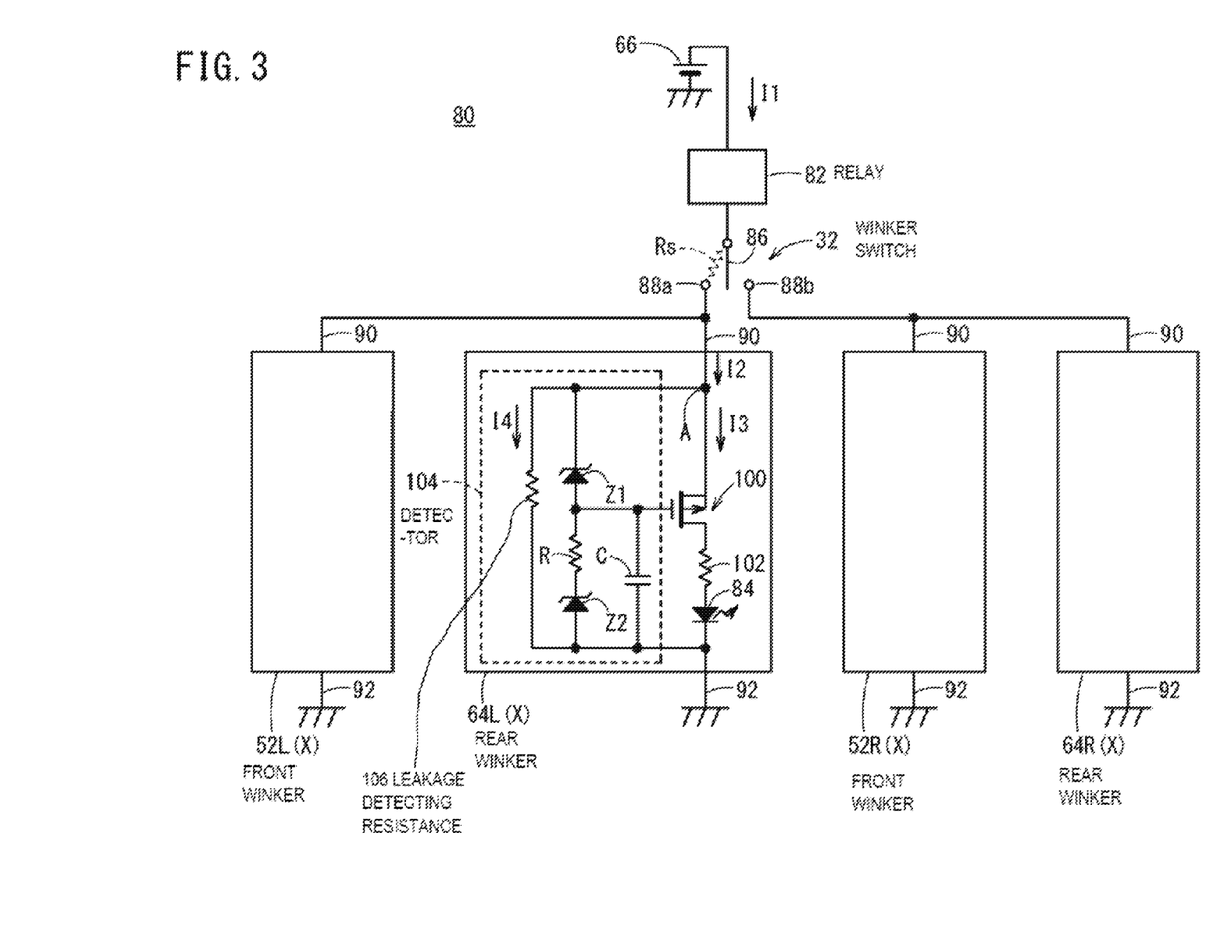
FIG. 3 is a circuit diagram of the vehicle LED lighting device system.

Next, a description will be presented concerning the vehicle LED lighting device system 80. FIG. 3 is a circuit diagram of the vehicle LED lighting device system 80. The vehicle LED lighting device system 80 comprises the front-winkers 52L, 52R, the rear winkers 64L, 64R, the winker switch 32, the power supply 66, and a winker relay (relay) 82. The front winkers 52L, 52R and the rear winkers 64L, 64R in the form of LED lighting devices have LED (Light Emitting Diode) light sources 84 therein. When the front winkers 52L, 52R and the rear winkers 64L, 64R are referred to collectively without distinction, they will be referred to simply as LED lighting devices X.

A positive terminal of the power supply 66 is connected to a movable contact 86 of the winker switch 32 through the winker relay 82, and a negative terminal of the power supply 66 is connected to a reference potential point. Stated otherwise, the negative terminal of the power supply 66 is grounded. A first fixed contact 88*a* of the winker switch 32 is connected to the front winker 52L and the rear winker 63L. A second fixed contact 88*b* of the winker switch 32 is connected to the front winker 52R and the rear winker 64R. In an initial state, the movable contact 86 of the winker switch 32 is not connected to either one of the first fixed contact 88*a* or the second fixed contact 88*b*. Responsive to an operation of the driver, the movable contact 86 is brought into contact, with the first fixed contact 88*a* or the second fixed contact 88*b*. Further, when a release operation is carried out, the movable contact 86 is returned to the initial state.

The respective LED lighting devices X are connected to the first fixed contact 88*a* or the second fixed contact 88*b* through a plus cable 90. The plus cable 90 is a cable for supplying electric current from the power supply 66 to the LED light sources 84 of the respective LED lighting devices X. The respective LED lighting devices X are connected to the reference potential point through a minus cable 92. The minus cable 92 is a cable for returning electric current that has flowed through the LED light sources 84 of the respective LED lighting devices X, to the power supply 66.

A circuit that connects the winker switch 32, the power supply 66, and the winker relay 82 is provided on the side of the vehicle body, and the respective LED lighting devices X are connected to the circuit through the plus cable 90 and the minus cable 92. The circuit configuration (circuit on the side of the vehicle body) that connects the winker switch 32, the power supply 66, and the winker relay 82 is the same as the circuit configuration on the side of a vehicle body in which a conventional bulb lighting device such as a halogen bulb or the like is used. An electric current from the power supply 66 is defined as a current I1, and the electric current that flows through each of the LED lighting devices X is defined as a current I2. At normal times, the current I1 from the power supply 66 flows through two of the LED lighting devices X (one each on the front side and the rear side), and therefore, the currents have the following relationship I1=2× I2. Moreover, among the LED lighting devices X on the front side and the rear side, if one of them fails, the following relationship I1=I2 holds.

Next, a description will be presented concerning the circuitry of the LED lighting devices X. Since the circuitry for each of the LED lighting devices X is the same, the description thereof will be made with reference to the example of the rear winker 64L. The rear winker 64L (LED lighting device X) includes a switching element 100, a current limiting resistance 102, an LED light source 84, and a detector 104. The switching element 100 is constituted by a P-channel type MOSFET. The detector 104 detects a voltage on the output side of the winker switch 32, and controls on and off states of the switching element 100. In the case that the LED lighting device X is the front winker 52L and the rear winker 64L, the voltage on the output side of the winker switch 32 is a voltage of the first fixed contact 88a, and in the case that the LED lighting device X is the front winker 52R and the rear winker 64R, the voltage on the output side of the winker switch 32 is a voltage of the second fixed contact 88b.

The switching element 100, the current limiting resistance 102, and the LED light source 84, in this order, are connected in series so as to connect the plus cable 90 and the minus cable 92. Specifically, a source of the switching element 100 is connected to the plus cable 90, and a drain thereof is connected through the current-limiting resistance 102 to an anode of the LED light source 84. A cathode of the LED light source 84 is connected to the minus cable 92.

In the case that the voltage (output voltage) on the output side of the winker switch 32 is greater than a predetermined value, the detector 104 turns the switching element 100 on, and in the case that the output voltage of the winker switch 32 is less than or equal to a predetermined value, the detector 104 turns the switching element 100 off. When the switching element 100 is turned on, electric current is supplied to the LED light source 84 from the power supply 66, and when the switching element 100 is turned off, supply of electric current to the LED light source 84 is suspended.

The detector 104 includes a leakage detecting resistance 106 that detects the output voltage of the winker switch 32. More specifically, a voltage across the leakage detecting resistance 106 is the output voltage of the winker switch 32. The leakage detecting resistance 106 is connected in parallel with the switching element 100, the current limiting resistance 102, and the LED light source 84, which are connected in series between the plus cable 90 and the minus cable 92. A connection point between the leakage detecting resistance 106 and the source of the switching element 100 will be referred to as a connection point A for the sake of convenience.

The detector 104 includes a resistance R with a comparatively large resistance value, Zener diodes Z1, Z2, and a capacitor C. The Zener diode Z1, the resistance R, and the Zener diode Z2, which are connected in series, are connected in parallel with the leakage detecting resistance 106. More specifically, a cathode of the Zener diode Z1 is connected to the plus cable 90, or in other words, the connection point A, and an anode thereof is connected to the cathode of the Zener diode Z2 through the resistance R. An anode of the Zener diode Z2 is connected to the minus cable 92. The anode of the Zener diode Z1 is connected to a gate of the switching element 100, and the cathode of the Zener diode Z2 is connected to the gate of the switching element 100 through the resistance R. The Zener diode Z2 and the resistance R are connected in parallel with the capacitor C.

When the movable contact 86 of the winker switch 32 is connected to the first fixed contact 88a, the output voltage of the winker relay 82 is applied to the connection point A. The output voltage of the winker relay 82 is greater than a predetermined value determined by the Zener voltage of the Zener diodes Z1, Z2. For this reason, since the voltage applied to the connection point A becomes higher than the predetermined voltage, a minute electric current flows through the resistance R and the Zener diodes Z1, Z2. When electric current flows through the Zener diodes Z1, Z2, a Zener voltage determined by the Zener diode Z1 exceeds the gate-to-source voltage that turns on the switching element 100, and therefore, the switching element 100 is turned on and electric current flows through the LED light source 84. As a result, the LED light source 84 is illuminated. When the voltage is imposed on the connection point A, an electric current flows through the leakage detecting resistance 106. The current that flows through the LED light source 84 is defined as a current I3, and the current that flows through the leakage detecting resistance 106 is defined as a current I4. The sum current of the current I3 and the current I4 equals the current I2. It should be noted that, since the currents that flow through the resistance R and the Zener diodes Z1, Z2 are sufficiently small with respect to the currents I3 and I4, such currents are ignored in the description.

At times when the movable contact 86 of the winker switch 32 is not in a state of being connected to the first fixed contact 88a, if a leakage current is generated due to reasons such as adherence of moisture to the winker switch 32, the movable contact 86 and the first fixed contact 88a become conductive. When such a leakage current occurs, a leakage resistance Rs is formed in the winker switch 32. Therefore, at the connection point A, a voltage is applied, which is a divided voltage generated by the output voltage of the winter relay 82 being divided by the leakage resistance Rs and the leakage detecting resistance 106. Accordingly, the voltage at the connection point A (output voltage of the winker switch 32, i.e., voltage across the leakage detecting resistance 106) becomes lower than a predetermined value determined by the Zener voltages of the Zener diodes Z1, Z2, and therefore, electric current does not flow through the resistance R and the Zener diodes Z1, Z2, and the switching element 100 is maintained in an off state. In the case that, the switching element 100 is in an off state, since electric current does not flow through the LED light source 84, the LED light source 84 is not illuminated. Moreover, in the case that the movable contact 86 of the winker switch 32 is not connected to the first fixed contact 88a, and if a leakage current is not generated, since a voltage is not imposed on the connection point A, the LED light source 84 is not illuminated.

Figure 4:
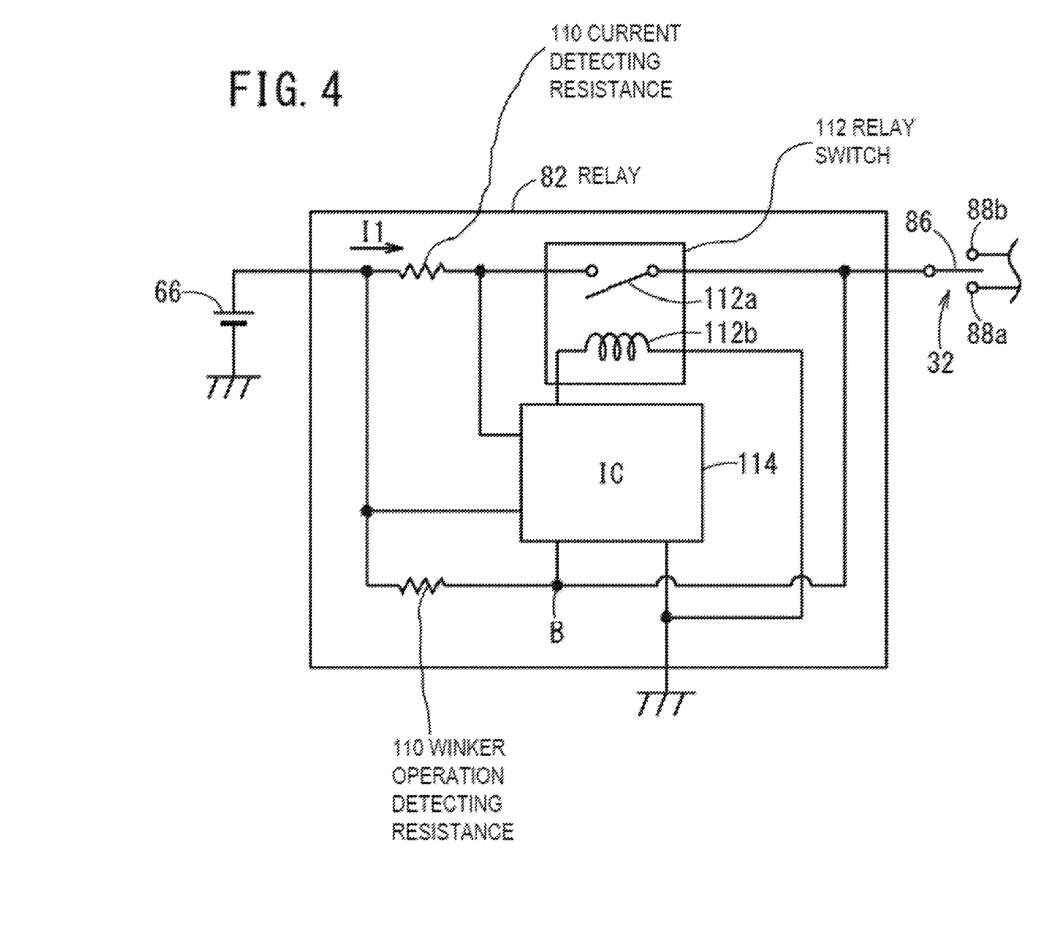
FIG. 4 is a circuit diagram of a winker relay shown in FIG. 3.

Next, the structure of the winker relay 82 will briefly be described with reference to FIG. 4. The winker relay 82, which is disposed between the power supply 66 and the input side (movable contact 86) of the winker switch 32, includes a current detecting resistance 110, a relay switch 112, and an IC (control unit) 114. The IC 114 is also used by the winker relay 82, which may be used for a bulb lighting device such as a halogen bulb or the like, and the IC 114 is not exclusive to controlling the LED lighting device X. The relay switch 112 includes a switch 112a and a coil 112b, and the current detecting resistance 110 and the switch 112a are connected in series with the power supply 66 and the winker switch 32. Further, one end side of the coil 112b is connected to the IC 114, and the other end side thereof is connected to the reference potential point. A winker operation detecting resistance 116 is connected in parallel with the current detecting resistance 110 and the switch 112a, which are connected together in series. Stated otherwise, one end side of the winker operation detecting resistance 116 is connected to a positive terminal of the power supply 66, and the other end side thereof is connected to the movable contact 86 of the winker switch 32. A voltage of the other end side of the winker operation detecting resistance 116 will be referred to as a voltage B for the sake of convenience.

In the case that the winker switch 32 is not operated, the voltage B is of the same voltage as the positive terminal of the power supply 66. However, by operation of the winker switch 32, when the movable contact 86 is connected to either one of the first fixed contact 88a or the second fixed contact 88b, the voltage B momentarily decreases from the voltage of the positive terminal of the power supply 66 to a voltage substantially equivalent to the VF (forward voltage drop) of the LED light source 84. Accordingly, the IC 114 detects the voltage B, whereby it is determined whether or not the winker switch 32 has been operated. Stated otherwise, the IC 114 judges whether or not the voltage B has become lower than a threshold value, and if it judges that the voltage B has become lower than such a threshold value, it is determined that the winker switch 32 has been operated.

When the IC 114 determines that the winker switch 32 has been operated, by supplying electric current to the coil 112b, the switch 112a is turned on. Consequently, electrical power is supplied to the winker switch 32, whereupon the LED light sources 84 of the front winker 52L and the rear winker 64L, or the front winker 52R and the rear winker 64R are illuminated.

When power is supplied to the winker switch 32, the IC 114 detects the voltage across the current detecting resistance 110, whereby the current I1 that flows through the winker switch 32 is detected. In addition, the IC 114 turns the supply of the current I1 to the coil 112b on and off at a frequency that corresponds to the detected current I1. Consequently, the switch 112a is repeatedly turned on and off at the frequency corresponding to the detected current I1. Owing thereto, the LED light sources 84 are blinking. In the case that the detected current is greater than, or equal to or less than a predetermined current value, the IC 114 changes the frequency at which the switch 112a is turned on and off.

For example, in the case that the movable contact 86 is connected to the first fixed contact 88a, and if either one of the LED light sources 84 of the front winker 52L and the rear winker 64L is not illuminated, since only the other LED light source 84 is illuminated, the current I1 becomes smaller. At this time, the IC 114 detects the current value, and by changing the frequency at which the switch 112a is turned on and off, from its normal state, the frequency (blinking speed) at which the other LED light source 84 blinks is made to change. As a result, the fact that one of the LED light sources 84 is not being lit can foe noticed by the driver. In this manner, the winker relay 82 can detect the state of illumination of the LED lighting devices X, on the basis of the current I1 that flows through the winker relay 82.

Moreover, the predetermined current value at which the winker relay 82 changes the frequency is finely adjusted depending on the characteristics of the light sources.

The current I3 that flows through the LED light source 84 of the LED lighting device X is a value determined by dividing a value obtained by subtracting the VF of the LED light source 84 from the voltage of the connection point A, by the current limiting resistance 102. On the other hand, the VF of the LED light source 84 is known to vary due to temperature or individual differences. As a result, the current I3 also varies due to such variation of the VF of the LED light source 84.

Further, as discussed above, since the winker relay 82 changes the frequency at which the switch 112a is turned on and off responsive to the value of the current I1, due to a variation in the current I3 under the influence of the VF of the LED light source 84, when the current I1 is affected thereby, the frequency at which the switch 112a is turned on and off fluctuates.

However, because the leakage detecting resistance 106 is connected in parallel with the switching element 100, the current limiting resistance 102, and the LED light source 84, it is possible to suppress the influence that the current I1 receives due to variations in the VF of the LED light source 84. Stated otherwise, a variation in the current I1 can be suppressed, and the detection accuracy of the current I1 can be enhanced.

To explain the reasons therefor in greater detail, since the variance of the leakage detecting resistance 106 is comparatively small, the current I4 that flows through the leakage detecting resistance 106 does not vary to a large extent. Additionally, the current I1 that flows through the winker relay 82 is a current made up of a summation of the current I3 that flows through the LED light source 84 and the current I4 that flows through the leakage detecting resistance 106, and therefore, it is possible to suppress variations in the current I1 due to the VF of the LED light source 84. Moreover, strictly speaking, the current I1 that flows through the winker relay 82 is a sum of the current I2 (current I3+current I4) of the front side LED lighting device X, and the current I2 (current I3+current I4) of the rear side LED lighting device X.

Figure 5:
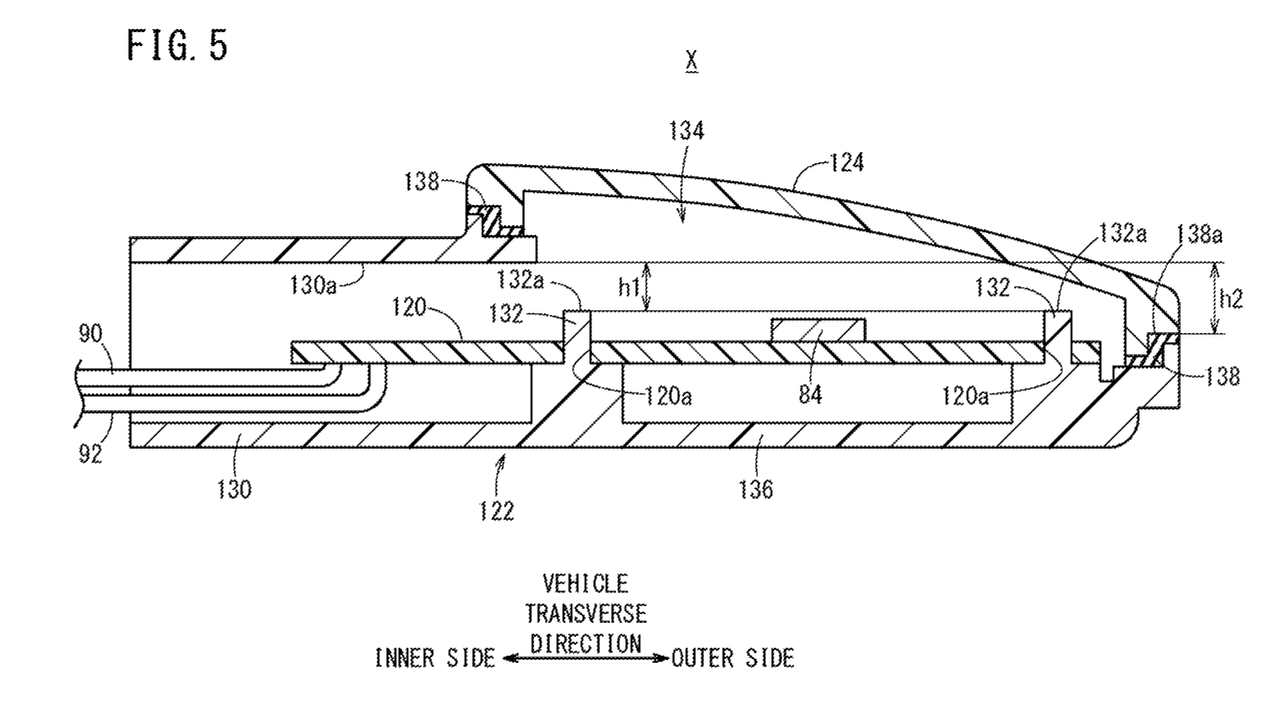
FIG. 5 is a side cross-sectional view of the LED lighting device shown in FIG. 1.
Figure 6:
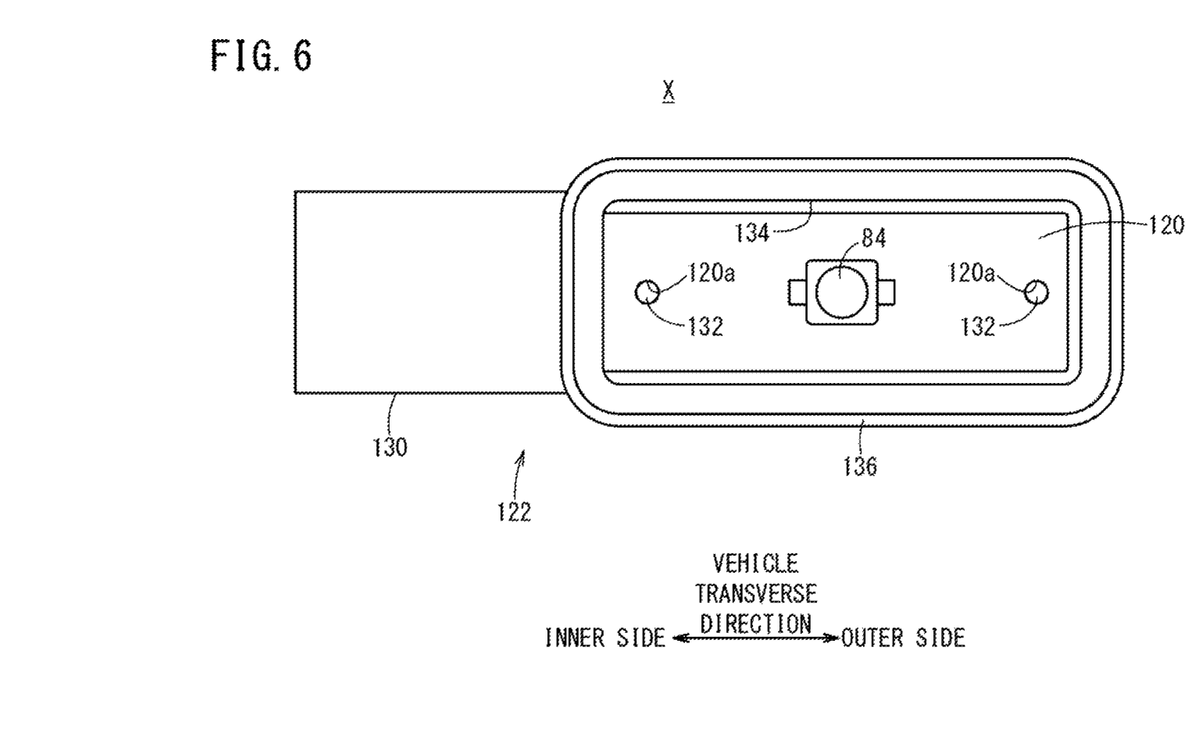
FIG. 6 is a plan view of the LED lighting device shown in FIG. 1.

Next, using FIGS. 5 and 6, a description will be presented concerning the mechanical structure of the LED lighting devices X. FIG. 5 is a side cross-sectional view of the LED lighting device X, and FIG. 6 is a plan view of the LED lighting device X. The LED lighting device X is equipped with a substrate 120 on which the LED light source 84 is mounted, a housing 122 supporting the substrate 120, and a lens 124 that covers the LED light source 84. In FIG. 6, the LED light source X is shown in a state with the lens 124 thereof removed. Although not illustrated, apart from the LED light source 84, the switching element 100, the current limiting resistance 102, and the detector 104 are also mounted on the substrate 120. Stated otherwise, the circuitry of the LED lighting device X is disposed on the substrate 120.

The housing 122 includes a tubular section 130 through which the plus cable 90 and the minus cable 92 pass, a fixing portion 132 to which the substrate 120 is attached, and an opening 134 covered by the lens 124 and through which light from the LED light source 84 is transmitted to the lens 124. More specifically, the housing 122 includes a support section 136 disposed contiguously with the tubular section 130 and which supports the lens 124, with the fixing portion 132 and the opening 134 being formed in the support section 136. The LED light source 84 and the fixing portion 132 are disposed and arranged inside the opening 134. The tubular section 130 is substantially in the shape of a rectangular parallelepiped.

The plus cable 90 and the minus cable 92 are connected to the substrate 120. The fixing portion 132 projects toward the lens 124 and is inserted into a hole 120a that is formed in the substrate 120. The substrate 120 and the fixing portion 132 are fixed together by welding. The substrate 120 is attached to the fixing portion 132 such that part of the substrate 120 is inserted into the tubular section 130. When the substrate 120 is attached to the housing 122, the following procedure is performed: the substrate 120 is inserted into the tubular section 130, and thereafter the fixing portion 132 is inserted into the hole 120a of the substrate 120. A seal member 138 with which the lens 124 is sealed is disposed on the outer circumference of the opening 134. The seal member 138 serves to prevent entry of water, dust or the like into a space formed by the housing 122 and the lens 124.

The tubular section 130 and the fixing portion 132 are formed such that a distance h1 between a fixing end part 132a of the fixing portion 132 on a side in the direction toward the lens 124 and an inner wall 130a of the tubular section 130 on a side where the lens 124 is disposed is longer than the thickness of the substrate 120. Further, the seal member 138 is formed such that a distance h2 between an end part 138a of the seal member 138 on a side in the direction toward the lens 124, the seal member 138 being disposed on an outer side in the vehicle transverse direction, and the inner wall 130a of the tubular section 130 is longer than the thickness of the substrate 120. Owing thereto, it is easy for the substrate 120 to be inserted into the tubular section 130, and attachment of the substrate 120 to the housing 122 is easily carried out.

In this manner, according to the above-described embodiment, in the vehicle LED lighting device system 80, the detector 104 is included that detects an output voltage of the winker switch 32, and causes the switching element 100 to interrupt the electric current that flows to the LED light source 84. Therefore, erroneous lighting of the LED light source 84 due to a leakage current of the winker switch 32 can be prevented. Further, a bulb lighting device such as a conventional halogen lamp or the like can be changed to an LED lighting device X without adding an LED control unit on the side of the vehicle body, and thus the present invention is economical.

The detector 104 includes the leakage detecting resistance 106, and in the case that a voltage across the leakage detecting resistance 106 becomes less than or equal to a predetermined value, the detector 104 causes the switching element 100 to carry out interruption of electric current. Therefore, with a simple structure, erroneous lighting of the LED light sources 84 due to a leakage current of the winker switch 32 can be prevented.

Since the leakage detecting resistance 106 is disposed in parallel with the LED light source 84 and the switching element 100 at a location between the plus cable 90 and the minus cable 92, the winker relay 82 detects a combined electric current of the electric current I3 flowing through the LED light source 84 and the electric current I4 flowing through the leakage detecting resistance 106. Owing thereto, even if there is a large variation in the VF of the LED light source 84, since the variation of the leakage detecting resistance 106 is comparatively small, a variation in the current I1 detected by the winker relay 82 can be suppressed.

The substrate 120, on which the LED light source 84, the switching element 100, and the detector 104 are disposed, is inserted into the tubular section 130 of the housing 122.

Therefore, the area of the substrate 120 can be extended within the tubular section 130, and the sizes of the lens 124 and the opening 134 can be made smaller, together with securing a space on which components can be arranged on the substrate 120.

The LED light sources 84 according to the above-described embodiment may each foe constituted from a single LED element, or may be constituted from multiple LED elements. By constituting the LED light source 84 by a single LED element, variation in the VF can be further suppressed. Stated otherwise, if the LED light source 84 is constituted from a plurality of LED elements, compared to the case of a single LED element, the variation of the VF becomes greater considering the LED light source 84 as a whole. Further, although as the switching element 100, a P-channel type MOSFET has been adopted, another switching element 100 such as an N-channel type MOSFET or the like may be adopted.

Further, although with the above-described embodiment, a description has been made in relation to a vehicle LED lighting device system 80 that causes illumination of the LED light sources 84 of the front winkers 52L, 52R and the rear winkers 64L, 64R, the vehicle LED lighting device system 80 is capable of being applied to other LED lighting devices in which LED light sources are illuminated by operation of a switch. For example, the vehicle LED lighting device system 80 may be applied to a headlight (LED lighting device) that is illuminated by a switching operation.

The invention claimed is:

1. A vehicle LED lighting device system comprising:
   an LED lighting device having an LED light source, a substrate on which the LED light source is mounted, a housing equipped with the substrate, and a lens covering the LED light source and which is attached to the housing;
   an operation switch configured to turn on and turn off the LED light source;
   a power supply connected to an input side of the operation switch;
   a plus cable that connects an output side of the operation switch and the LED lighting device, the plus cable being configured to supply an electric current from the power supply to the LED light source; and
   a minus cable configured to return an electric current that flows through the LED light source to a side of the power supply;
   the vehicle LED lighting device system further comprising:
   a switching element disposed in series with the LED light source and configured to interrupt an electric current that flows to the LED light source; and
   a detector configured to detect a voltage on an output side of the operation switch and cause the switching element to interrupt the electric current;
   wherein the switching element and the detector are disposed in an interior of the LED lighting device, and
   wherein the detector includes a leakage detecting resistance, a resistance, and a Zener diode, the resistance and the Zener diode being connected in parallel with the leakage detecting resistance, an electric current flowing through the resistance and the Zener diode being smaller than an electric current flowing through the leakage detecting resistance, and by operating the switching element at a voltage determined based on the Zener diode, in a case that a voltage across the leakage detecting resistance is less than or equal to a predetermined value, the detector causes the switching element to interrupt the electric current.

2. The vehicle LED lighting device system according to claim 1, further comprising:
   a relay between an input side of the operation switch and the power supply, the relay being configured to detect a state of illumination of the LED lighting device by an electric current;
   wherein, between the plus cable and the minus cable, the leakage detecting resistance is disposed in parallel with the LED light source and the switching element.

3. The vehicle LEU lighting device system according to claim 1, wherein:
   the housing includes a tubular section through which the plus cable and the minus cable pass, a fixing portion to which the substrate is attached, and an opening covered by the lens, the opening being configured to transmit light from the LED light source to the lens;
   the fixing portion and the LED light source are disposed inside the opening;
   the switching element and the detector are disposed on the substrate; and
   part of the substrate is inserted into the tubular section.

4. The vehicle LED lighting device system according to claim 3, wherein a distance between a fixing end part of the fixing portion on a side in a direction toward the lens and an inner wall of the tubular section on a side where the lens is disposed is longer than a thickness of the substrate.

5. The vehicle LED lighting device system according to claim 3, wherein:
   a seal member with which the lens is sealed is disposed on an outer circumference of the opening; and
   a distance between an end part of the seal member on a side in a direction toward the lens and an inner wall of the tubular section on a side where the lens is disposed is longer than a thickness of the substrate the seal member being disposed on an outer side in a vehicle transverse direction.

6. The vehicle LED lighting device system according to claim 1, wherein the switching element is a MOSFET.

\* \* \* \* \*